US007162335B2

(12) United States Patent
He et al.

(10) Patent No.: US 7,162,335 B2
(45) Date of Patent: Jan. 9, 2007

(54) GRAPHIC AIRWAYS DISPLAYS FOR FLIGHT MANAGEMENT SYSTEMS

(75) Inventors: Gang He, Morristown, NJ (US); Blake W. Wilson, Peoria, AZ (US); John G. Suddreth, Cave Creek, AZ (US); Carlos M. Gameros, Glendale, AZ (US); Peter L. Daniel, Glendale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 350 days.

(21) Appl. No.: 10/741,111

(22) Filed: Dec. 19, 2003

(65) Prior Publication Data

US 2005/0137758 A1 Jun. 23, 2005

(51) Int. Cl.
*B64C 23/00* (2006.01)

(52) U.S. Cl. .............................. 701/3; 701/14; 701/16; 701/120; 701/206; 340/947; 345/156

(58) Field of Classification Search ................ 701/3–4, 701/14–16, 18, 120–122, 200–202, 206; 340/945, 947, 961, 963–973; 345/156–160, 345/173, 619–621, 625, 629, 635–636, 660–661; 715/810–813, 835–836
See application file for complete search history.

(56) References Cited

U.S. PATENT DOCUMENTS 5,041,982 A * 8/1991 Rathnam .................... 701/200
5,340,061 A 8/1994 Vaquier et al. ............. 244/175
5,715,163 A * 2/1998 Bang et al. ................. 701/202
5,852,440 A * 12/1998 Grossman et al. .......... 715/811
5,956,019 A * 9/1999 Bang et al. ................. 345/173
6,112,141 A 8/2000 Briffe et al. .................. 701/14
6,449,556 B1 9/2002 Pauly ......................... 701/206
6,571,155 B1 * 5/2003 Carriker et al. ................ 701/3
6,678,588 B1 * 1/2004 He ................................ 701/3
6,822,624 B1 * 11/2004 Naimer et al. ................. 345/9

FOREIGN PATENT DOCUMENTS

EP 0677803 A2 10/1995
EP 0763714 A2 3/1997

OTHER PUBLICATIONS

PCT International Search Report: PCT/US2004/042273, Apr. 22, 2005, International Search Authority— EP Patent Office, 7 pages.

* cited by examiner

*Primary Examiner*—Gertrude A. Jeanglaude
(74) *Attorney, Agent, or Firm*—Ingrassia Fisher & Lorenz

(57) ABSTRACT

Methods and apparatus are provided for interactively building flight paths for entry into an aircraft flight management system (FMS). The apparatus comprises a database containing map information, a display for presenting the map information, a user controlled cursor and selection buttons, all under the control of a graphics processor. The processor presents the map information with included navigation features on the display, correlated with the aircraft position and cursor location. When the cursor overlies a navigational feature (airways, waypoints, etc.), the processor highlights the feature. Feature ID information may also pop up when the feature is highlighted. Using a mouse button or equivalent, the user selects the highlighted feature or ID, whereupon the processor sends the information associated therewith to the FMS. By successively highlighting and selecting features or IDs an entire flight path can be identified and entered automatically into the FMS without the need for individual text entry.

20 Claims, 7 Drawing Sheets

GRAPHIC AIRWAYS DISPLAYS FOR FLIGHT MANAGEMENT SYSTEMS

TECHNICAL FIELD

The present invention generally relates to displays for a vehicle, and more particularly, to aircraft flight path displays for use in connection with an aircraft flight management system.

BACKGROUND

Modem map displays, particularly those used in aircraft for flight planning and management, are capable of displaying a considerable amount of information such as flight navigation planning information and terrain information. The terrain information generally consists of situational awareness information (obstacles, landmarks, etc.) and warnings that, among other things, may indicate where the aircraft may potentially impact such terrain features may be in the aircraft's flight path. The flight planning and navigation information generally consists of flight path, altitude and other information useful to the flight crew in planning and following a particular path (and altitude) of the aircraft over the ground to reach a desired destination. Available "airways" are often superimposed upon a lateral map display to give a combined representation of designated flight paths and terrain features.

An airway represents a designated flight path that a flight crew may follow to navigate their aircraft to a predetermined destination. An airway is, in general, composed of named waypoints defined in space and associated navigation aids. An airway is a line segment connecting various waypoints. As used herein, the terms "navigation" and "navigational" information are intended to refer collectively to such airway, waypoint, and other flight path information. A navigational display generally provides a graphical representation of such navigation information superimposed on a lateral terrain map.

Modem avionics electronic displays are capable of displaying airways similar to a paper airways chart. FIG. 1 is a highly simplified representation of prior art static graphical airway display 10. For simplicity the terrain features associated with the underlying lateral terrain map have been omitted from FIG. 1. Small aircraft shaped symbol 12 located approximately in the center of display 10 represents the current position and flight direction of the aircraft with respect to the underlying terrain map. Circle 14-1 surrounding aircraft symbol 12 represents the range scale selected by the user, in this case for example, about 50 NM. The airways for this terrain location are shown by various line segments 16 extending in different directions and intersecting at various waypoint nodes 18 where airways 16 cross or meet. Airway identification (ID) symbols or names 19 (e.g., "G001") are shown within rectangular boxes. Reference number 19 is intended to refer to all of the identification symbols on display 10 and reference number 16 to all of the airways. Other information may also be provided on the display. It is not unusual for prior art airways display 10 to show hundreds of symbols 19, depending upon the range setting selected by the user. The larger the range setting, the greater the number of symbols 19, airways 16 and nodes 18 within the displayed map area The data needed to display the terrain features and the available airways and waypoints are stored in memory on the aircraft. This is well known in the art.

Since the electronic display is generally much smaller than the corresponding paper chart and since there are large numbers of airways, waypoints and identification (ID) symbols in most regions of interest, the graphic electronics display can only meaningfully show this information in a small range, for example, usually ≦50 nautical miles (NM) around the current aircraft position. At larger ranges the display can become very cluttered and can be difficult for the flight crew to find the navigational information of interest. Further, prior art displays are generally static, that is the display may not change unless the range setting or aircraft location changes. In general, the flight crew may need to memorize and/or read text based information, such as airway IDs and waypoint IDs (names of airway entry and exit points), in order to define the airways to be used for the aircraft flight path and then manually input such text based information into the flight management system. This process can become increasingly burdensome when, for example, the same identifiers (IDs) apply to multiple locations on the graphic map display and/or when the flight crew is not familiar with the IDs for a particular airway path. More time and attention is then needed to identify the correct airway entry and exit points, to verify the text information and to correctly enter this information into the flight management system to insure that the correct flight path is established. The problem is potentially exacerbated when multiple intersecting airways may need to be used to reach the desired destination. In general, once the airway information is entered into the flight management system the aircraft will be either manually or automatically directed along the selected flight path. Proper selection and entry of the airway(s) information is important in order to safely traverse the intervening airspace to arrive at the desired destination. Thus, there continues to be a need for improved means and methods for dealing with the clutter found on prior art graphical navigational and terrain displays, to be able to more easily view airways of interest to the flight crew, and to more simply and more accurately select those desired to be traversed by the aircraft.

Accordingly, it is desirable to be able to graphically visualize and manage the desired airways in both large and small-scale displays without the burden of a cluttered screen. In addition, it is desirable to be able to graphically select those airways and entry and exit waypoints points desired to be used and automatically enter such information into the flight management system. Furthermore, other desirable features and characteristics of the present invention will become apparent from the subsequent detailed description and the appended claims, taken in conjunction with the accompanying drawings and the foregoing technical field and background.

BRIEF SUMMARY

An apparatus is provided for interactively building flight paths for entry into an aircraft flight management system (FMS). The apparatus comprises a database containing map information, a display for presenting the map information, a user controlled cursor and selection buttons, all under the control of a graphics processor coupled to the FMS. The processor presents the map information with included navigation features on the display. These are correlated with the aircraft position and cursor location. When the cursor overlies a navigational feature (airways, waypoints, etc.), the processor highlights the feature. Feature ID information may also pop up when the feature is highlighted. Using a mouse button or equivalent, the user selects the highlighted feature or ID, whereupon the processor sends the ID or other information associated therewith to the FMS. By successively highlighting and selecting features and/or IDs an entire flight path can be identified and entered automatically into the FMS without the need for individual text entry.

A method is provided for interactively choosing a particular navigational feature using a graphic display with an operator controlled marker and selection means, from among navigational information stored in a data base, and entering information about the chosen navigational feature into a vehicle management system, comprising, showing navigational information from the database on the display, locating the marker on the display relative to the navigational information and when the marker falls on a particular navigational feature, highlighting the particular navigational feature and when the operator actuates the selection means while the particular navigational feature is highlighted, sending information on the particular navigational feature to the vehicle management system.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
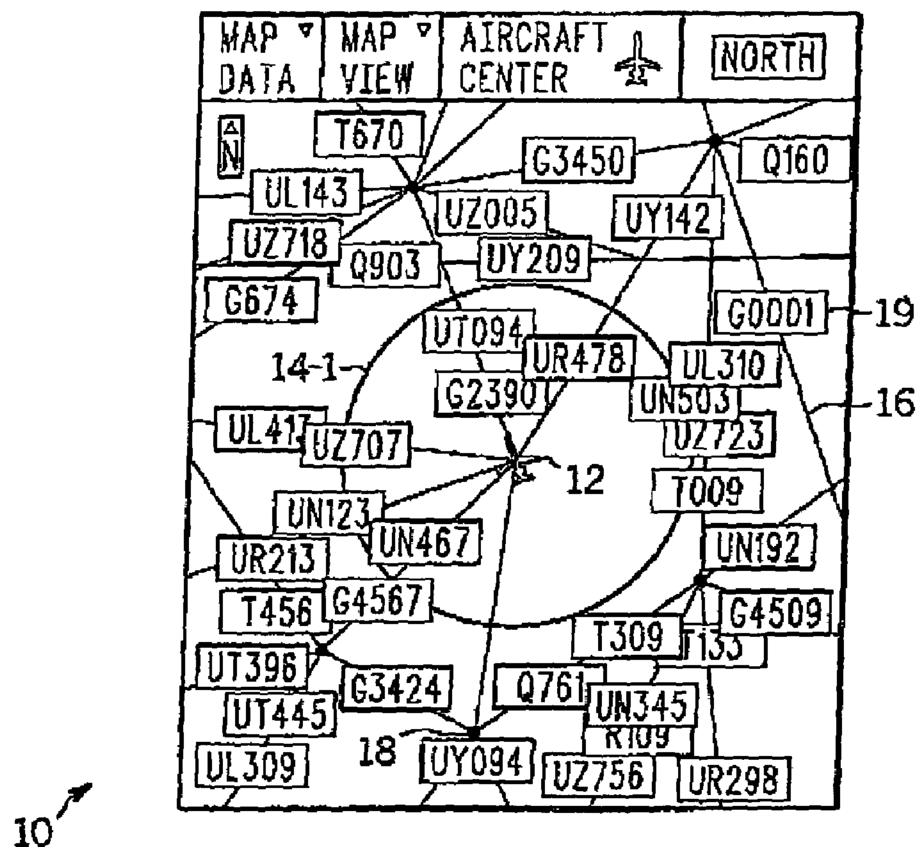
FIG. 1 is a highly simplified representation of a prior art graphical airway display map.
Figure 2:
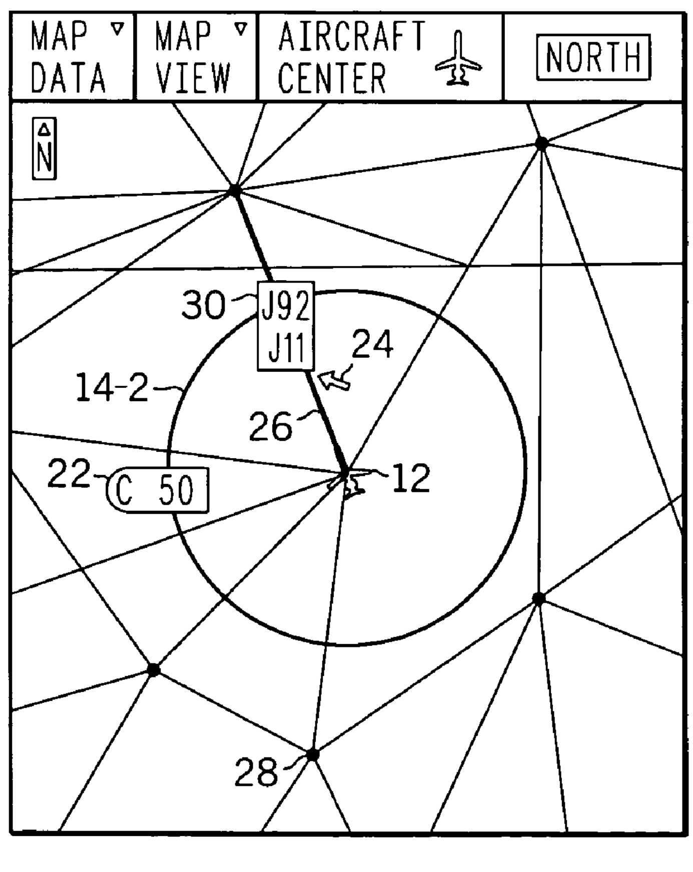
FIG. 2 is a highly simplified representation of a graphical airway display map according to a first aspect of the present invention.

FIG. 2 is a simplified representation of graphical airway display map 20 according to a first aspect of the present invention. The display of FIG. 2 differs from the display of FIG. 1 in that display 20 is interactive while display 10 is generally passive. For example, display 20 of the present invention has the following features:

(A) Range scale indicator 22 is desirably, but not essentially, associated with range circle 14-2, in this example, indicating that the range circle radius is about 50 NM.

(B) Moveable cursor 24 is provided on display 20 to allow various flight paths 26 and/or waypoints 28 to be graphically identified and selected by the user, e.g., using a "point and click" method. As cursor 24 is moved on display 20 and approaches or crosses a particular airway (e.g., airway 26) then the visual properties (e.g., color, brightness, width or some combination thereof, etc.) of that airway 26 change, and its associated identifier (ID) symbol(s) 30 (e.g., J92, J11) automatically appear. As used herein, the words "highlight" and "highlighted" are intended to refer to such change in visual properties so that the screen object touched by the cursor is more easily seen. The clutter caused by the large number of fixed identifiers 19 shown in prior art display 10 is avoided since an airway is not highlighted and waypoint identifiers (IDs) are not shown until cursor 24 approaches or touches the associated airway. Those airways not proximate to cursor 24 remain dimmed, thereby minimizing the visual clutter. Cursor 24 may be moved by a mouse, scrolling wheel, pointer stick, glide pad or any equivalent device. Such devices are well known in the computer art.

(C) Once particular airway 26 has been identified using cursor 24 (e.g., by placing cursor 24 on or near airway 26 so that it highlights), the user can select it, for example, by clicking a mouse control button or selector switch or equivalent, and thereby enter highlighted (i.e., identified) airway segment 26 and its associated ID 30 into the flight management system (FMS). This avoids having to type in text information to identify the desired airway and waypoints and avoids the errors often associated with such steps. Thus, the present invention provides for interactive graphical identification and selection of the desired airways and waypoints.

Figure 3:
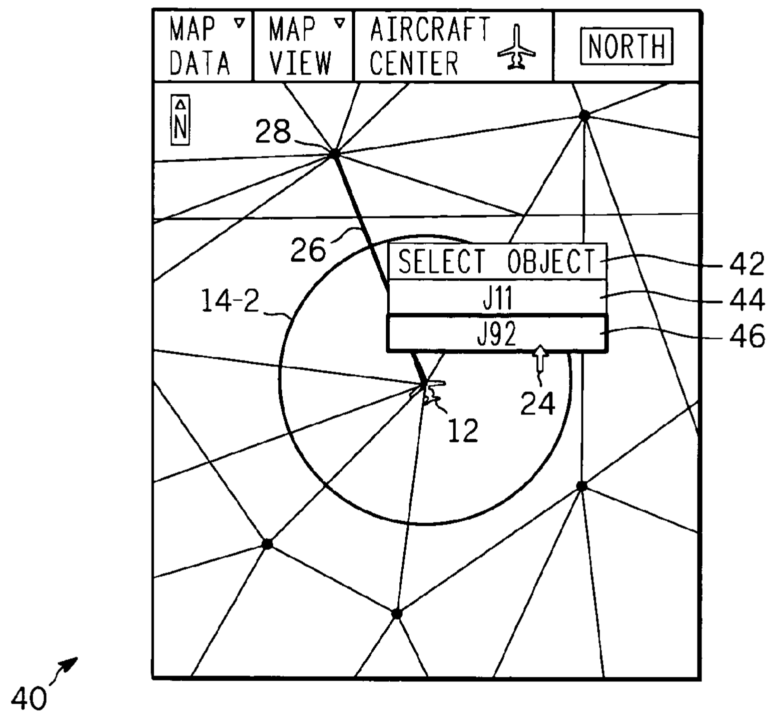
FIG. 3 is a highly simplified representation of a graphical airway display map according to a second aspect of the present invention.

FIG. 3 is a simplified representation of graphical airway display map 40 according to a second aspect of the present invention. Display 40 is analogous to display 20 of FIG. 2. Display 40 differs from display 20 in that list or dialog or drop-down menu 42 is shown on display 40, so that the user can easily choose between two airways 44 (J11) or 46 (J92) that share airway segment 26. An airway can extend through several successive waypoints and therefore, a particular airway segment (e.g., segment 26) can be part of several different airways that share at least a pair of common waypoints. In FIG. 3, airway ID 46 (J92) is shown as being highlighted by cursor 24 and may be selected by an appropriate mouse click or other switch activation. The user chooses from list, dialog or drop-down menu 42 and selects one or more of the alternatives presented. Any appropriate means for selecting a highlighted screen object may be used, including but not limited to, electrical, mechanical or optical switches activated by moving a finger, hand or other body part or by speaking a command into a sound sensitive system. Persons of skill in the art of interactive graphic computer displays will understand how to implement such selection techniques.

Figure 4:
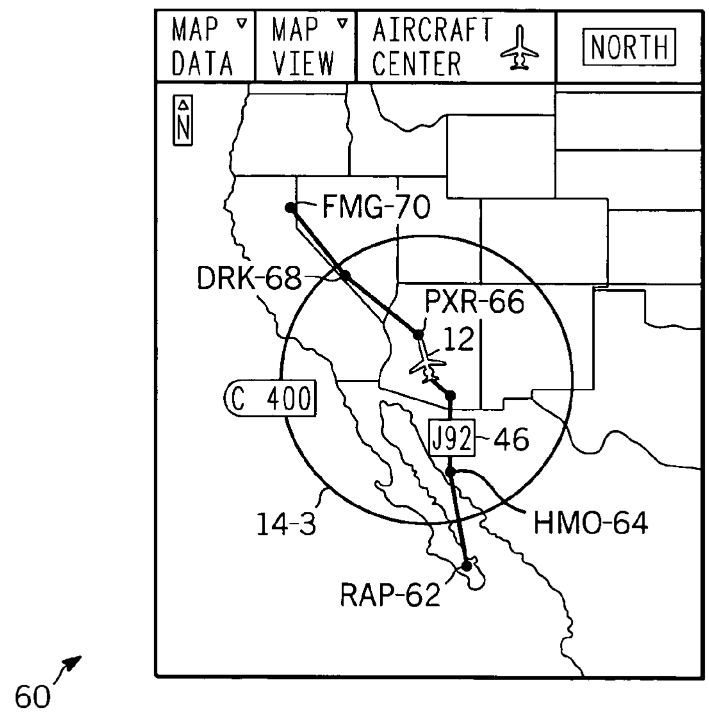
FIG. 4 is a highly simplified representation of a graphical airway display map according to a third aspect of the present invention.

FIG. 4 is a simplified representation of a graphical airway display map 60 according to a third aspect of the present invention. Display 60 of FIG. 4 differs from display 40 of FIG. 3 in that the scale is different, for example, range circle 14-3 corresponds to a radius of 400 NM and only the most general terrain features are shown. A much larger map area is visible. Display 60 illustrates an alternate method of route planning and selection. In this instance, the operator utilizes cursor 24 to graphically identify and sequentially select the desired waypoints, for example RAP-62, HMO-64, PXR-66, DRK-68, FMG-70. In this manner an entire route can be laid out, with the connecting airways automatically appearing as the waypoints are indicated. The waypoints generally correspond to known aircraft beacon or geographic feature locations (e.g., RAP, HMO, PXR, etc.) familiar to the pilots. The waypoint selections can be made directly on the long-range map (large displayed area) such as that shown in FIG. 4. Alternatively, highlighting and selection can be made on shorter range maps (e.g., like FIG. 2) by selecting particular segments in a first map view and then, using scroll bars or the like, sliding the map view to expose further terrain and waypoint choices, in much the same manner as is common in computer displays. For the same reasons as explained in connection with FIGS. 2–3, the view is uncluttered since the available waypoint identifiers are not illuminated until the cursor 24 contacts or is brought into close proximity to the waypoints. Alternatively, by clicking on starting and ending waypoints, intermediate airway segments and waypoints can be automatically illuminated or highlighted and, if appropriate, selected for entry into the flight management system. The particular mode of operation may be chosen by the user, for example by using function select switch means 88 on input panel 98 shown in FIG. 6, and/or clicking on various options provided in drop-down menus on the graphic display. The foregoing examples are not intended to be limiting and persons of skill in the art will understand how to provide such features based on the description herein.

Figure 5:
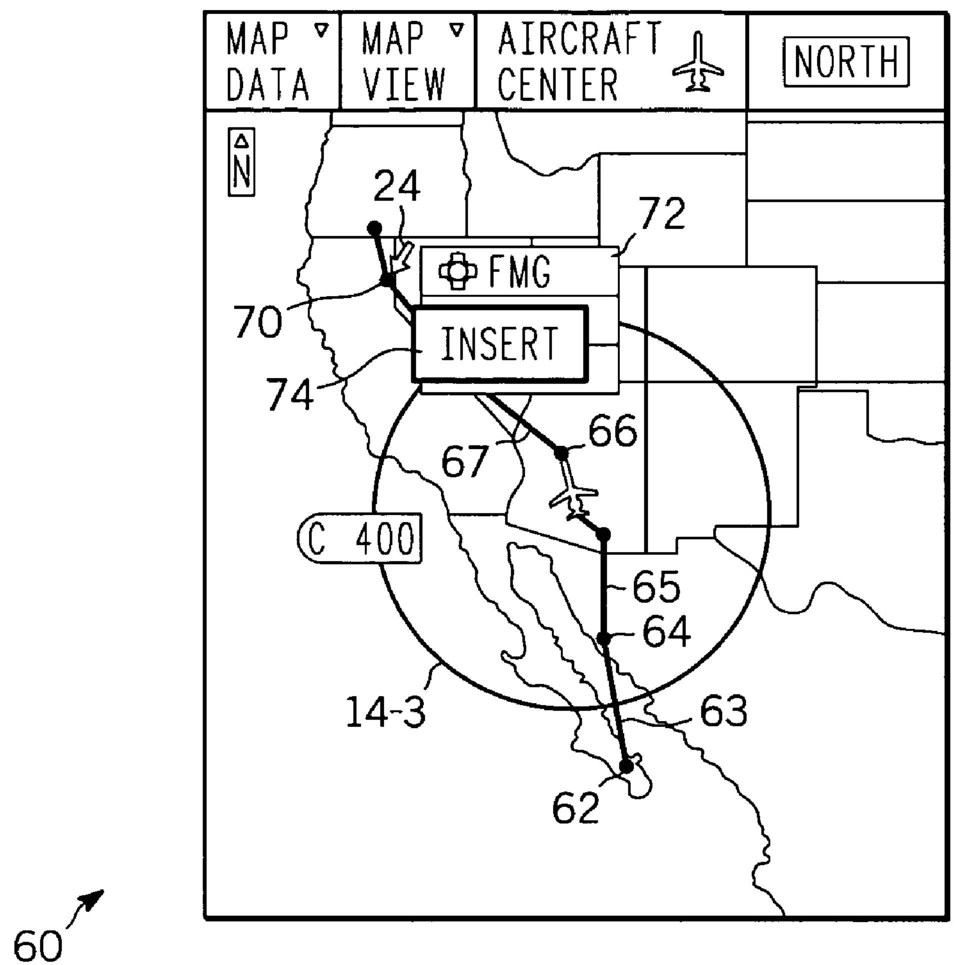
FIG. 5 is a highly simplified representation of a graphical airway display map according to a further aspect of the present invention.

FIG. 5 is a simplified representation of graphical airway display map 60 illustrating further details of the present invention. For example, the user employs cursor 24 to highlight starting waypoint RAP-62 . This causes first airway segment 63 leading to waypoint HMO-64 to highlight. First waypoint 62 and airway segment 63 may be sent directly to the flight management system or provisionally stored while further segments are added. Highlighting and clicking on each successive waypoint (e.g., HMO-64, PXR-66, etc.) causes each intervening airway segment (e.g., 65, 67, etc.) to highlight and remain highlighted as the overall route is assembled. As illustrated in FIG. 5, waypoint FMG70 has been identified and by appropriate mouse clicks or equivalent, list or drop-down or selection menu 72 is caused to appear. (The abbreviation "DDM" is intended to include all such alternative means of providing the operator with selectable choices.) DDM 72 shows the presently identified waypoint (e.g., FMG70) and offers insert button 74. By clicking (or equivalent) on insert button 74, waypoint FMG70 is conveniently selected. The planned route can be entered into the flight management system waypoint by waypoint, e.g., as illustrated in FIG. 5, or provisionally assembled and entered as a whole after it is assembled, depending upon the operating mode selected by the user. This illustrates how an entire flight plan route may be graphically constructed waypoint by waypoint. While manual entry of particular waypoint identifiers is not precluded, the present invention using interactive graphic selection on the graphic map display greatly reduces the time and effort required to construct a flight plan. This also reduces the likelihood of error since each airway path and/or waypoint is graphically identified (e.g., highlighted) before being selected, and once selected can be automatically entered into the flight management system along with its associated identifier information. Thus, the speed and reliability of route planning is greatly enhanced by the present invention.

Figure 6:
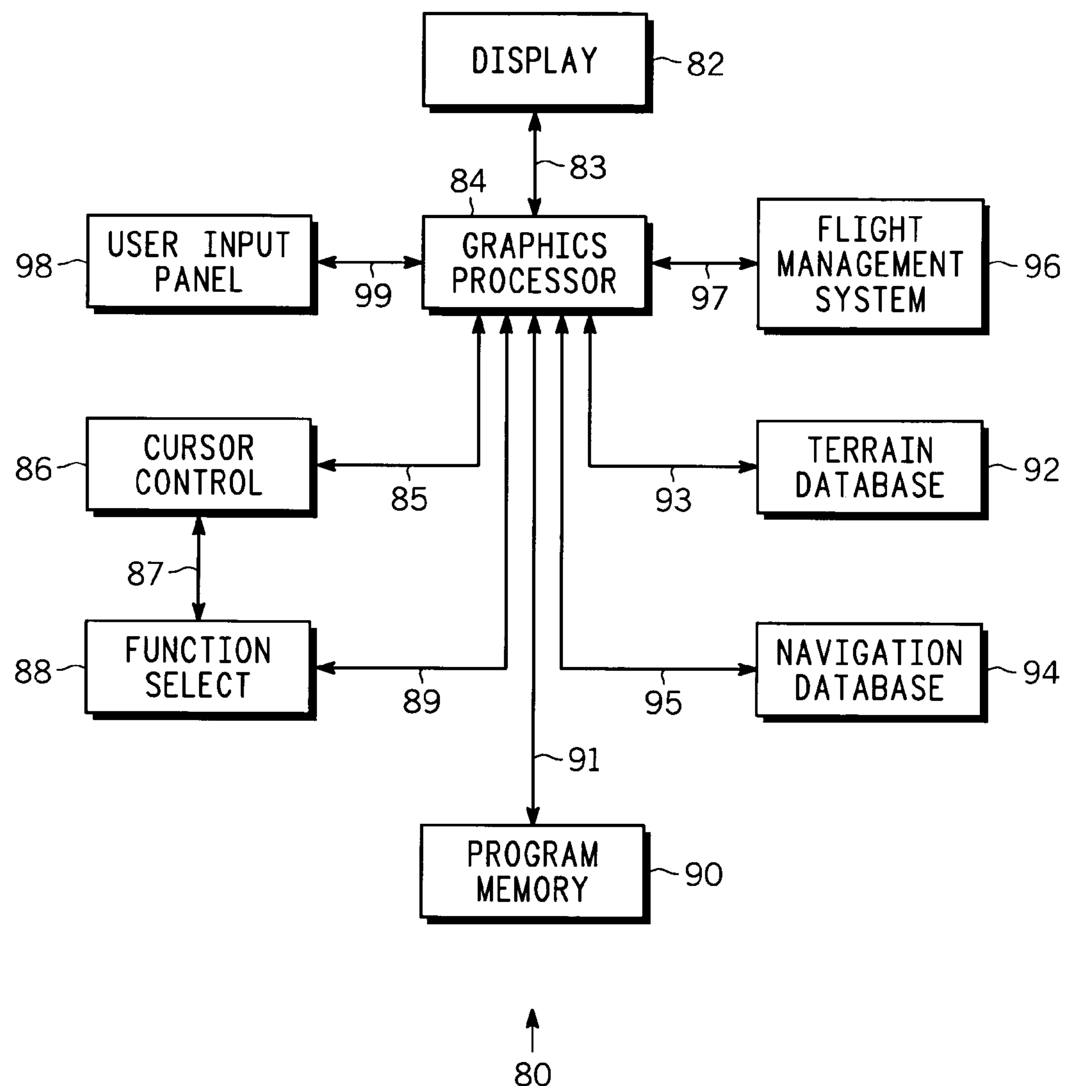
FIG. 6 is a simplified electrical schematic diagram of a graphical navigation display generation system according to the present invention.

FIG. 6 is a simplified electrical schematic diagram of an exemplary display generation system 80 for carrying out the steps described above, according to the present invention. System 80 comprises display 82, typically a color CRT or liquid crystal display or the like, graphics processor 84, cursor control 86, function select switch or switches (or voice actuation unit) 88, program memory 90, terrain database 92, and navigation database 94. Display 82 is coupled to graphics processor 84 by bus or leads 83. Graphics processor 84 is coupled to cursor control (e.g., a mouse or other pointing device) by bus or leads 85 and to function select switches 88 (e.g., one or more mouse or pointer buttons or voice actuation units) by bus or leads 89. Graphics processor 84 is coupled to program memory 90 by bus or leads 91, to terrain database 92 by bus or leads 93 and to navigation database by bus or leads 95. Graphics processor 84 is coupled to aircraft flight management system (FMS) 96 by bus or leads 97. Cursor control 86 and function select 88 may be optionally directly coupled by leads or bus 87, but this is not essential. User settings input panel 98 is coupled to graphics processor 84 by leads or bus 99 and is provided to allow the user to input various functional settings, such as but not limited to, display range, color selections, map orientation (e.g., where is north), data to be displayed, actions provided by function select 88, and so forth.

Terrain database 92 typically contains topographical and lateral map information concerning the terrain over which the aircraft is flying. Navigation database 94 contains information on airways and waypoints and other flight relevant data for the same terrain area as in terrain database 92. While the databases 92, 94 are shown as being separate, this is merely for convenience of explanation and is not essential. The information therein may be combined in a single database. For the purposes of the present invention, it does not matter how or where the terrain and navigational information is stored as long as it is available to graphics processor 84 for presentation on display 82 and transmission to flight management system (FMS) 96.

Figure 7:
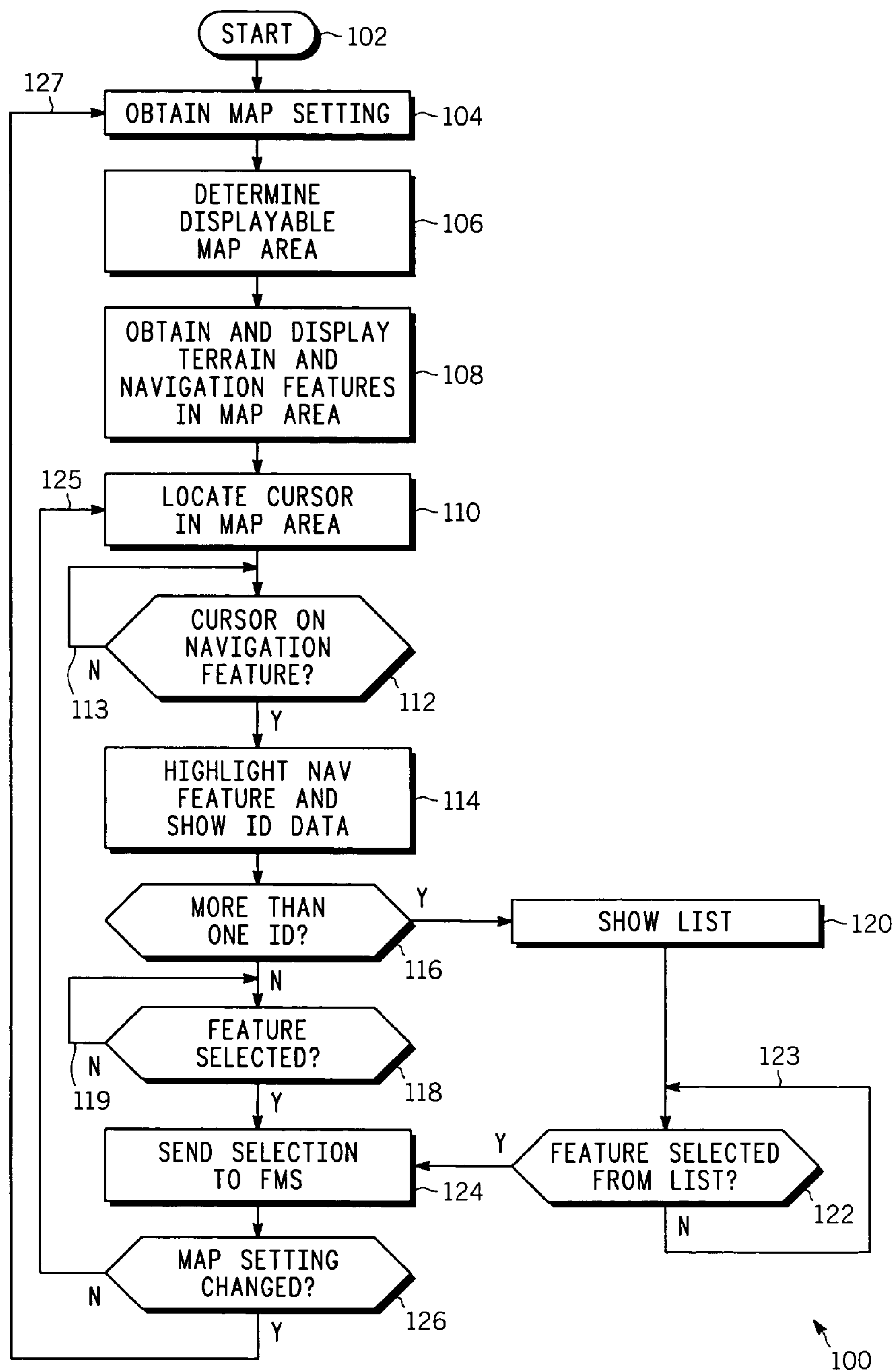
FIG. 7 is a simplified flow chart of the method of the present invention according to a first embodiment.
Figure 8:
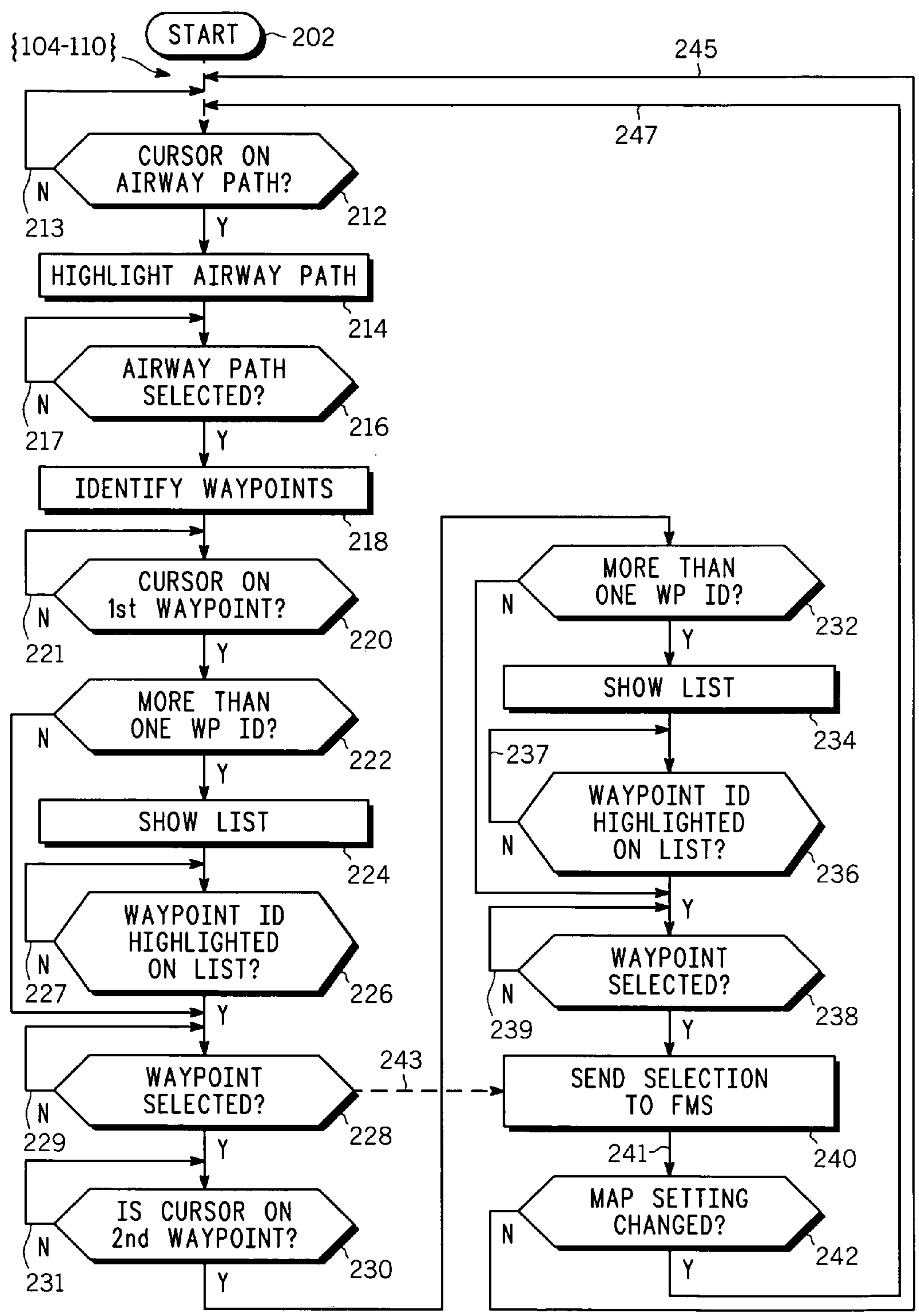
FIG. 8 is a simplified flow chart of the method of the present invention according to a second embodiment and showing further details.

Program memory 90 conveniently contains programs controlling the operation of graphics processor 84 and management of display 82, but this is not essential since such programs can also by provided internally within graphics processor 84. Programs for the general operation of a graphics processor and display are well known in the art. FIGS. 7–8 show simplified flow charts illustrating the method of the present invention with respect to the operation of system 80 to interactively generate and select airway, waypoint and route information as has been previously described in connection with FIGS. 2–5. Based on the description herein, persons of skill in the art will understand how to provide hardware logic and/or software programs for the operation of system 80.

Cursor control 86 may be any type of pointing device for controlling the location of a cursor or other pointer or marker on the display screen. As used herein, the word "cursor" is intended to include any type of arrow, bar, block, or other symbol that may be presented on the display screen, the position of which is controlled by cursor control 86. Non-limiting examples of cursor controls are a mouse, roller ball, scroll wheel, pointer stick, glide pad, combinations thereof and so forth. Such devices are well known in the art. Function select switches 88 may be any type of switch or switches or voice actuation unit for highlighting and/or selecting screen objects on which the cursor has been placed using cursor control 86. These are well known in the art and it will be understood by persons of skill in the art that the functions performed thereby may be altered by the user. For example, where a screen object becomes highlighted when the cursor is placed thereon; it may be selected by actuating a function select switch of any kind. Further it may be selected in various ways depending upon which function select switch is actuated and whether it actuated by a single 'click' or 'double click' or voice and so forth. Such arrangements are familiar to users of computers equipped with graphical pointing devices. Thus, a highlighted navigation feature may be temporarily selected during provisional route build-up or finally selected for direct entry in the flight management system.

While cursor control 86 and function select 88 are described herein as hardware equipment manipulated by the user, persons of skill in the art will also understand that they can also be implemented as touch-screen functions where the user moves the cursor and/or selected screen objects by touching the display screen in appropriate locations, or by voice actuation or a combination thereof. Accordingly the terms and functions 'cursor control' and 'function select' are intended to include these alternate embodiments and not be limited merely to a mouse or pointer stick or other mechanical, electrical or optical device.

The operation of system 80 will now be described. Graphics processor receives user settings (e.g., range, etc.) from input panel 98, present aircraft location information from FMS 96, retrieves the appropriate terrain and navigation system information for that location and range from data bases 92, 94, and presents the result on display 82 as illustrated for example in FIGS. 2–5. FIG. 2 is a simplified illustration of what is visible on display 82 at the beginning of a route selection process. The position of cursor 24 on screen 82 is determined by cursor control 86. The user moves cursor 24 onto or near a particular airway, e.g., airway 26, which is then highlighted by graphics processor 84. Highlighting may include, for example (but not limited to), changing the color, brightness, width, character (e.g., flashing or static, continuous or dashed, etc.) or a combination thereof or other visible property of airway 26 or by any other means (e.g., popping up the airway ID info), to alert the user that the cursor has identified the particular airway. The associated airway identification (ID) information may appear automatically on, or in the vicinity of, the highlighted airway, or in response to the operator actuating a function select switch or giving a voice command. Either arrangement is useful. If the user desires to make the identified airway a part of a planned flight path, then the identified (e.g., highlighted) airway may be selected by actuating the same (e.g., double clicking) or another function select switch (e.g., right clicking) or voice command or other means. Graphics processor 84 then sends the selected airway information to FMS 96. Alternatively, when a user places the cursor on an airway, the airway may highlight and the waypoint ID information associated with such airway appear at each end. The user then can identify (e.g., highlight) and select the waypoints defining the airway, which processor 84 then sends to FMS 96 to define the desired route. Either approach is useful.

The highlighting and selection may be provisional or final depending upon the mode of operation chosen by the user using input 98 or other means. The map window may be moved using scroll bars (not shown) or the range designation changed to cover a larger area. This permits the user to progressively select further route segments in generally the same manner (see FIGS. 4–5) until the entire aircraft route is defined and entered into FMS 96. Where a particular airway segment involves multiple airway IDs (e.g., see FIG. 2), drop-down or subsidiary menus or lists are provided (e.g., see FIG. 3) on display 82 by processor 84 based on info retrieved from navigation database 94, thereby giving the user an opportunity to highlight and select the particular route desired. The same applies when multiple waypoint identifiers are present. While the operation of system 80 is described in terms of cursor 24 being placed "on" a particular airway or waypoint using cursor control 86, those of skill in the art will understand that as used herein the term "on" is not limited to precise coincidence but includes approaching within a predetermined distance to the desired object on the screen, wherein the predetermined distance may be determined either by the system designer or the user depending upon which arrangement best suits their particular situation. Thus, as used herein the word "on" includes both "coincidence" and "within a predetermined proximity to". The operation of system 80 is explained more fully in connection with the flowcharts of FIGS. 7 and 8.

FIG. 7 is a simplified flow chart of method 100 of the present invention according to a first embodiment. Method 100 begins with START 102, which preferably occurs on system start-up. In step 104 the map settings (e.g., range, color, orientation, etc.) are obtained depending upon what the user has set into input panel 98. In step 106, processor 84 determines the displayable map area, that is, given the finite dimensions of screen 82 and the range selected by the user, processor 84 determines what terrain and navigation area can be shown on display 82. In step 108, the terrain and navigational features information stored in memories 92, 94 is retrieved for the map area determined in step 106 and sent to display 82. In general, it is convenient to place the aircraft present location at the center of the screen, but this is not essential. The present aircraft location is conveniently provided by FMS 96 but this is not essential. Any means of obtaining the current aircraft position may be used. (As used herein, the words "flight management system" and the abbreviation "FMS" are intended to include whatever aircraft system is providing current aircraft position information.) In step 110, the position of cursor 24 on screen 82 is determined in relation to the terrain and navigational features (i.e., to what position (location) the user has moved cursor 24). Steps 108, 110 may be performed in either order.

In query 112 it is determined whether or not cursor 24 is on a navigation feature (e.g., airway, waypoint, etc.) on display 82. If the outcome of query 112 is NO (FALSE), then as shown by path 113, query 112 is repeated. If the outcome of query 112 is YES (TRUE) then step 114 is executed wherein the navigational feature on which the cursor rests is highlighted as previously described and, preferably but not essentially, the associated identification (ID) information displayed in close proximity to the highlighted feature (e.g., see FIG. 2). The associated ID information may appear automatically when the navigational feature is highlighted or may be called up by an appropriate mouse click (or equivalent) depending upon the mode of operation chosen by the user. Query 116 is then performed to determine whether the ID information includes multiple IDs, such as are shown for example in FIG. 2. If the result of query 116 is NO (FALSE) then query 118 is executed wherein it is determined whether or not the highlighted feature has been selected, that is, confirmed by a user executed mouse click or equivalent, either provisionally or finally. If the outcome of query 118 is NO (FALSE) then as shown by path 119, query 118 is repeated. If the outcome of query 118 is YES (TRUE) indicating that the user has selected the highlighted feature, then step 124 is executed whereby the selected feature ID and related data obtained from navigation data base 94 are sent to FMS 96.

Returning now to step 116, if the outcome of query 116 is YES (TRUE) then SHOW LIST step 120 is executed wherein the list of multiple IDs is presented to the user for his or her selection, for example, as illustrated in FIG. 3. While graphical presentation of this information is preferred, any means that permits the user to select among the items on the list may be employed. Query 122 is then executed wherein it is determined whether or not one (or more) of the multiple IDs has been selected by the user. Depending on the circumstances, the multiple IDs may be alternate choices, that is, the user chooses one from the list obtained in step 120, or multiple choices may be appropriate, for example, choosing two from a list of three or more, or the like. If the outcome of step 122 is NO (FALSE) indicating that the user has not yet made a choice, then as shown by path 123, step 122 is repeated. If the outcome of query 122 is YES (TRUE) indicating that the user has made a choice or choices from among the multiple IDs provided on the list of step 120, step 124 is executed wherein the chosen ID(s) and related data are sent to FMS 96. Following SEND step 124, query 126 is preferably but not essentially executed wherein it is determined whether the map settings obtained in step 104 have changed, that is, has the user altered the settings on input panel 98 or otherwise changed the mode of operation of system 80. If the outcome of query 126 is NO (FALSE) then as shown by path 125, method 100 preferably but not essentially returns to step 110 to determine whether the cursor has been moved to another navigational feature. If the outcome of query 126 is YES (TRUE) then as shown by path 127, method 100 returns to initial step 104. With method 100, the navigational feature referred to can be with an airway or a waypoint or a combination thereof. The same general steps apply.

FIG. 8 is a simplified flow chart of method 200 of the present invention according to a second embodiment and showing further details. In method 200 it is assumed for convenience of explanation that the navigational feature initially highlighted by the cursor is an airway and that route planning is being accomplished by selecting waypoints. Following START 202, which conveniently occurs on system start-up, steps 104 through 110 described in connection with FIG. 7 are executed leading to query 212, wherein it is determined whether or not cursor 24 is on an airway path or navigational feature. Query 212 is analogous to query 112. If the outcome of query 212 is NO (FALSE) then as shown by path 213, query 212 is repeated. If the outcome of query 212 is YES (TRUE) then step 214 is desirably executed wherein the airway path on which cursor 24 rests is highlighted as previously described. Step 214 is analogous in part to step 114. Query 216 is then executed wherein it is determined whether or not the highlighted airway path is selected, e.g., in one of the several ways previously described for provisionally or finally selecting a navigational feature. If the outcome of query 216 is NO (FALSE) then as shown by path 217, query 216 is repeated. If the outcome of query 216 is YES (TRUE) then step 218 is executed wherein the waypoints associated with this airway are identified, e.g., illuminated and/or highlighted on the display. Those of skill in the art will appreciate that steps 214, 216, 218 may be combined in that the waypoints associated with the highlighted airway path may be identified automatically in connection with step 214 without requiring an intermediate airway select step by the user.

Query 220 is then executed to determine whether or not the cursor is on a first of the highlighted and identified waypoint nodes, it does not matter which one. If the outcome of query 220 is NO (FALSE) then as shown by path 221, query 220 is repeated. If the outcome of query 220 is YES (TRUE) then query 222 is executed to determine whether more than one ID, i.e., more than one waypoint ID, is associated with the highlighted node. Steps 220 and 222 may be executed in either order. If the outcome of query 222 is NO (FALSE) then method 200 proceeds to query 228 (step 228 is described later). Returning now to step 222, if the outcome of query 222 is YES (TRUE) then SHOW LIST step 224 is executed wherein the list of multiple IDs is retrieved from navigation database 94 and displayed on screen 82, preferably in proximity to the highlighted waypoint node. Step 224 is analogous to step 120. Following step 224, query 226 is executed wherein it is determined whether one or more items on the list has (or has not) been highlighted by the user, e.g., by means of the cursor. If the outcome of query 226 is NO (FALSE) then step 226 is repeated. If the outcome of query 226 is YES (TRUE) or the outcome of query 222 is NO (FALSE) then query 228 is executed wherein it is determined whether or not the first waypoint has been selected by the user following the outcomes of steps 222 or 226. If the outcome of query 228 is NO (FALSE) then query 228 is repeated.

If the outcome of query 228 is YES (TRUE) then program flow proceeds to query 230 wherein it is determined whether or not the cursor is on a second waypoint. Query 230 is equivalent to query 220 but for a second waypoint. If the outcome of query 230 is NO (FALSE) then as shown by path 231, query 230is repeated. Subsequent steps 232, 234, 236, 238 for the second waypoint are equivalent to steps 222, 224, 226, 228 for the first waypoint and the descriptions provided for steps 222, 224, 226, 228 are incorporated herein by reference for steps 232, 234, 236, 238 respectively. When the outcome of query 238 is YES (TRUE) then execution proceeds to step 240 wherein the waypoint IDs selected by the user (which actions are verified by query steps 228 and 238) are sent to FMS 96. Following step 240, as shown by path 241, query 242 equivalent to query 126 is executed wherein it is determined whether or not the map settings or other user operating mode features have changed. Outcome path 245 corresponding to NO (FALSE) outcome of query 242 and outcome path 247 corresponding to YES (TRUE) outcome of query 242 are equivalent to paths 125 and 127 respectively of method 100 and lead back to steps 110 and 104 respectively. Method 200 is repeated in whole or part to identify subsequent airways and waypoints, thereby building up the entire flight path. Once two waypoints have been selected (provisionally or finally) at either end of an initial airway segment, further airway segments extending from either of the waypoints may be added by identifying and selecting (provisionally or finally) the waypoint at the distal end of the next desired airway segment and, as shown by dashed pathway 243, method 200 passes directly from step 228 to step 240 for such subsequent waypoints.

While the foregoing description has been presented in the context of aircraft flight planning and management, persons of skill in the art will understand based on the description herein that, while the present invention is especially well suited to aircraft flight planning and management, it is applicable to route planning and management with any type of vehicle; land vehicles and sea vehicles as well as aircraft vehicles. Accordingly, such applications are intended to be included in the claims that follow and the words “airways” and “waypoints” and “flight management system” and the abbreviation “FMS” are intended not to be limited merely to flight operations but to include pathways for such other types of vehicles, navigational planning for such vehicles and input to management systems of such other vehicles.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. For example, while method 200 of FIG. 8 has been described for the situation where route planning is accomplished by selection and entering of waypoints, persons of skill in the will understand that it also applies to route planning by sequential selection and entering of airway segments, especially under circumstances where multiple airways share individual segments and the user must choose from among several alternatives common to a particular segment. It should be understood that various changes can be made in the function and arrangement of elements without departing from the scope of the invention as set forth in the appended claims and the legal equivalents thereof.

What is claimed is:

1. A system for interactively displaying and selecting flight paths airways for an aircraft using an on-screen marker, comprising:

a flight management system for providing current aircraft location information and receiving selected navigational path information;

one or more databases containing terrain map information and navigational path information;

a display having a screen for interactively displaying terrain and navigational path information and the on-screen marker;

a control device for positioning the marker on the display screen;

a selection device for choosing an airway;

a graphics processor coupled to the flight management system, to the one or more databases, to the display, to the control device and to the selection device, for presenting the terrain and navigational information obtained from the one or more databases on the display screen and presenting current aircraft location obtained from the flight management system on the display screen and presenting the marker on the display screen, the current aircraft location and the marker being located relative to the terrain and navigational information, wherein the marker location on the display screen is responsive to the control device; and when the marker location falls on a displayed airway segment, the graphics processor highlights the displayed airway segment and displays each airway with which the highlighted airway segment is associated, and when the selection device is actuated to select one of the airways with which the highlighted airway segment is associated while the airway segment is highlighted, the graphics processor sends information about the selected airway to the flight management system.

2. The system of claim 1 further comprising a program memory store coupled to the graphics processor for providing computer programs executed by the graphics processor.

3. The system of claim 1 further comprising a user input panel coupled to the graphics processor whereby the input panel allows an operator to alter the function select or other behavior of the system.

4. The system of claim 1 wherein the control device and the selection device are operationally coupled without passing through the graphics processor.

5. A method for interactively choosing a particular airway using a graphic display with an operator controlled marker and selection means, from among navigational information stored in a data base, and entering information about the chosen airway into a vehicle management system, comprising:

showing a plurality of airway segments on the display, each airway segment associated with one or more airways; locating the marker on the display highlighting a particular airway segment when the marker is located on the particular airway segment;

displaying each airway with which the highlighted airway segment is associated;

selecting one of the displayed airways with the selection means while the particular airway segment is highlighted; and sending information on the selected airway to the vehicle management system.

6. The method of claim 5 further comprising prior to the showing step, obtaining information on a map range desired to be presented on the graphic display and determining how large an area of navigational information can be shown on the display within the map range, and limiting the displayed navigational information to correspond thereto.

7. The method of claim 5 wherein the showing step further comprises showing terrain information along with the navigational information.

8. The method of claim 5 wherein the highlighting step comprises displaying identification (ID) data associated with one or more airways with which the highlighted airway segment is associated.

9. The method of claim 8 wherein if the highlighted airway segment is associated with more than one airway, each with an 1D associated therewith, displaying a selection list containing the IDs for each of the airways with which the airway segment is associated.

10. The method of claim 9, when the operator actuates the selection means while at least one ID from the selection list is highlighted, proceeding to the sending step with respect to the highlighted ID.

11. A method for selecting and entering flight navigational information into a flight management system for controlling operation of an aircraft using an interactive graphical map display having a operator controlled cursor marker, terrain and navigational map information stored in a data base coupled to the display, and an operator controlled selection means, the method comprising:

displaying graphical map information containing airway segment on the display, the displayed airway segment being initially un-highlighted;

determining if the cursor marker on the display is on a particular airway segment and when it is, highlighting the particular airway segment and displaying each airway with which the highlighted airway segment is is associated; and determining whether a particular displayed airway has been selected by the user, and when it is, sending information on the selected airway to the flight management system.

12. The method of claim 11 prior to the displaying step, obtaining the graphical information containing airway segment from the database.

13. The method of claim 11 wherein the determining step comprises first determining whether the cursor marker on the display is on an airway segment and if so, highlighting one or more waypoints associated with the airway segment.

14. The method of claim 13 wherein the second determining step comprises determining whether a first of the highlighted waypoints has been selected by the user and when it is, sending the information thereon to the flight management system.

15. The method of claim 13 wherein the second determining step comprises determining whether a second of the highlighted waypoints has been selected by the user and when it is, sending the information thereon to the flight management system.

16. The method of claim 11 further comprising after the sending step, determining whether or not user selectable map settings have been changed, and if NO, returning to the first determining step and if YES returning to the displaying step.

17. A system for interactively displaying and selecting flight paths airways for aircraft using an on-screen marker, comprising:

a cursor control device adapted to receive user input commands and operable, in response Thereto, to supply on-screen marker position commands;

a processor adapted to receive navigation data and the marker position commands and operable, in response thereto, to supply one or more airway display commands and one or more marker display commands; and a display coupled to receive the airway display commands and the marker display commands, the display configured, upon receipt thereof, to display (i) a plurality of airway segments (ii) the on-screen marker at the commanded marker position, wherein the airway commands cause (i) a displayed airway segment to be highlighted, and (ii) each airway with which the highlighted airway segment is associated to be displayed, if the on-screen marker is positioned at least proximate one of the displayed airway segments.

18. The system of claim 17, further comprising:

a selection device adapted to receive user input commands and operable, in response thereto, to supply airway selection commands, wherein:

the processor is further adapted to receive the airway selection commands and is further operable, in response thereto, to issue airway information display commands, and the display is further coupled to receive the airway information display commands and is further operable, in response thereto, to display information about the airways corresponding to the airway selection commands.

19. A method of displaying airways on a display using a moveable marker, comprising:

displaying a plurality of airway segments on the display;

displaying the moveable marker on the display; and highlighting a one of the displayed airway segments, and displaying each airway with which the highlighted airway segment is associated, if the moveable marker is positioned at least proximate the displayed airway segment.

20. The method of claim 19, further comprising:

selecting a displayed airway with which the highlighted airway segment is associated; and displaying information about the selected airway.

* * * * *

UNITED STATES PATENT AND TRADEMARK OFFICE

CERTIFICATE OF CORRECTION

PATENT NO. : 7,162,335 B2
APPLICATION NO. : 10/741111
DATED : January 9, 2007
INVENTOR(S) : Gang He et al.

It is certified that error appears in the above-identified patent and that said Letters Patent is hereby corrected as shown below:

Column 11, line 23, “paths” should be changed to --path--;
Column 12, line 9, “display” should be changed to --display;--
Column 12, line 34, “1D” should be changed to --ID--;
Column 12, line 49, “segment” should be changed to --segments--;
Column 12, line 49, “airway segment” should be changed to --airway segments--;
Column 12, line 54, “is is” should be changed to --is--;
Column 12, lines 61-62, “segment from” should be changed to --segments from--;
Column 13, line 17, “paths” should be changed to --path--;
Column 13, line 20, “Thereto” should be changed to --thereto--;
Column 13, line 29, “segments (ii)” should be changed to --segments and (ii)--;
Column 14, line 22, “highlighting a one” should be changed to -- highlighting one --.

Signed and Sealed this

Twenty-ninth Day of May, 2007

JON W. DUDAS
*Director of the United States Patent and Trademark Office*